US012138931B2

(12) United States Patent
Muto et al.

(10) Patent No.: US 12,138,931 B2
(45) Date of Patent: Nov. 12, 2024

(54) PRINTING APPARATUS AND INK SUCKING UNIT CLEANING METHOD

(71) Applicant: SCREEN HOLDINGS CO., LTD., Kyoto (JP)

(72) Inventors: Shogo Muto, Kyoto (JP); Yasunori Akiyoshi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 86 days.

(21) Appl. No.: 17/897,705

(22) Filed: Aug. 29, 2022

(65) Prior Publication Data

US 2023/0095416 A1 Mar. 30, 2023

(30) Foreign Application Priority Data

Sep. 24, 2021 (JP) ................................ 2021-156163

(51) Int. Cl.

*B41J 2/165* (2006.01)
*B41J 25/304* (2006.01)

(52) U.S. Cl.

CPC ......... *B41J 2/1652* (2013.01); *B41J 2/16511* (2013.01); *B41J 2/16532* (2013.01); *B41J 2/16547* (2013.01); *B41J 2/16552* (2013.01); *B41J 2/16508* (2013.01); *B41J 2002/1655* (2013.01); *B41J 2/16585* (2013.01); *B41J 25/304* (2013.01)

(58) Field of Classification Search

CPC .. B41J 2/1652; B41J 2/16511; B41J 2/16532; B41J 2/16547; B41J 2/16552; B41J 2/16508; B41J 2/16585; B41J 25/304; B41J 2002/1655

See application file for complete search history.

(56) References Cited

U.S. PATENT DOCUMENTS

| | | | |
|---|---|---|---|
| 5,552,811 | A | 9/1996 | Kurata et al. |
| 2008/0186352 | A1 | 8/2008 | Sasayama |

(Continued)

FOREIGN PATENT DOCUMENTS

| | | | |
|---|---|---|---|
| JP | 10-119295 | A | 5/1998 |
| JP | 5042797 | B2 | 10/2012 |

(Continued)

OTHER PUBLICATIONS

Extended European Search Report issued in corresponding European Patent Application No. 22193393.0-1014, dated Feb. 21, 2023.

*Primary Examiner* — Yaovi M Ameh
(74) *Attorney, Agent, or Firm* — Rimon P.C.

(57) ABSTRACT

The cleaning liquid is supplied to the head facing flat surface, and the dummy flat surface of the dummy block facing the head facing flat surface contacts the cleaning liquid. This causes the cleaning liquid to be spread on the head facing flat surface by the dummy flat surface. The cleaning liquid spread on the head facing flat surface is sucked through the suction holes of the suction block. The suction holes can be cleaned by the cleaning liquid passing through the suction holes according to suction. On this occasion, the ink supplied to the head facing flat surface is removed through the suction holes of the suction block. The suction holes have both a function of removing the ink from the discharge heads H and a function of removing the cleaning liquid from the head facing flat surface.

8 Claims, 12 Drawing Sheets

(56) References Cited

U.S. PATENT DOCUMENTS

| | | | | |
|---|---|---|---|---|
| 2014/0132669 | A1 | 5/2014 | De Roeck | |
| 2016/0200106 | A1 | 7/2016 | Nakano | |
| 2018/0104959 | A1* | 4/2018 | Hanakawa | B41J 2/1714 |
| 2020/0130355 | A1* | 4/2020 | Kanazawa | B41J 2/16505 |

FOREIGN PATENT DOCUMENTS

| | | | |
|---|---|---|---|
| JP | 2015-080913 | A | 4/2015 |
| JP | 2015-217593 | A | 12/2015 |
| JP | 2015-231729 | A | 12/2015 |
| JP | 2019-136876 | A | 8/2019 |

* cited by examiner

PRINTING APPARATUS AND INK SUCKING UNIT CLEANING METHOD

CROSS REFERENCE TO RELATED APPLICATION

The disclosure of Japanese Patent Application No. 2021-156163 filed on Sep. 24, 2021 including specification, drawings and claims is incorporated herein by reference in its entirety.

BACKGROUND OF THE INVENTION

1. Field of the Invention

This invention relates to a technique for cleaning an ink sucking unit sucking an ink adhering to a discharge head discharging the ink.

2. Description of the Related Art

Conventionally, a discharge head discharging an ink by an ink-jet method has been used in a printing apparatus. In such a printing apparatus, it is known that a discharge failure of being unable to properly discharge the ink from nozzles occurs due to the solidification of the ink adhering to the discharge head. Accordingly, cleaning for removing an ink from a discharge head by a cap, a wiper or the like is appropriately performed in JP 2015-231729A, JP 2015-217593A and JP H10-119295A.

SUMMARY OF THE INVENTION

An ink sucking unit sucking the ink from suction holes facing the discharge head can be used to remove the ink from the discharge head as described above. However, the ink sucking unit itself may be contaminated with the ink while repeatedly sucking the ink. To deal with this, it is effective to separately provide a mechanism for removing the ink from the ink sucking unit. On the other hand, the addition of such a mechanism possibly causes the complication of the configuration of the printing apparatus and a cost increase.

This invention was developed in view of the above problem and aims to enable the removal of an ink from an ink sucking unit sucking the ink from a discharge head to be reliably performed by a simple mechanism.

A printing apparatus according to the invention, comprises: a discharge head having an ink discharging surface, in which a nozzle opens, and discharging an ink from the nozzle; an ink sucking unit having a head facing surface, in which a suction hole opens, and sucking the ink through the suction hole; a negative pressure applier applying a negative pressure to the suction hole of the ink sucking unit; a cleaning liquid supplier supplying a cleaning liquid to the head facing surface; an auxiliary cleaning member having an auxiliary cleaning surface; a driver moving the ink sucking unit between a head cleaning region at which the head facing surface is facing the ink discharging surface and a self-cleaning region at which the head facing surface is facing the auxiliary cleaning surface; and a controller controlling the negative pressure applier, the cleaning liquid supplier and the driver, wherein: the controller includes: a negative pressure controller controlling the negative pressure applier; a drive controller controlling the driver; and a supply controller controlling the cleaning liquid supplier, when performing a head cleaning, the drive controller controls the driver to move the ink sucking unit to the head cleaning region and further move the ink sucking unit while the head facing surface of the ink sucking unit is facing the ink discharging surface of the discharge head in the head cleaning region, and the negative pressure controller controls to activate the negative pressure applier and generate a negative pressure in the suction hole of the ink sucking unit, thereby sucking the ink adhering to the ink discharging surface through the suction hole, when performing a self-cleaning, the drive controller controls the driver to move the ink sucking unit to the self-cleaning region and cause the head facing surface of the ink sucking unit to face the auxiliary cleaning surface in the self-cleaning region, the supply controller controls the cleaning liquid supplier to supply the cleaning liquid to the head facing surface of the ink sucking unit from the cleaning liquid supplier in the self-cleaning region, and the negative pressure controller controls to activate the negative pressure applier and generate a negative pressure in the suction hole of the ink sucking unit, thereby sucking the cleaning liquid through the suction hole while bringing the cleaning liquid supplied to the head facing surface into contact with the auxiliary cleaning surface.

An ink sucking unit cleaning method according to the invention, comprises: supplying a cleaning liquid to a head facing surface of an ink sucking unit configured to suck an ink adhering to an ink discharging surface of a discharge head, which is configured to discharge the ink from a nozzle open in the ink discharging surface, through a suction hole open in the head facing surface; bringing an auxiliary cleaning surface of an auxiliary cleaning member facing the head facing surface and the cleaning liquid supplied to the head facing surface into contact; and sucking the cleaning liquid on the head facing surface through the suction hole.

In the invention (printing apparatus, ink sucking unit cleaning method) thus configured, the ink sucking unit has the head facing surface in which the suction hole is open, and the ink is removed from the discharge head by sucking the ink adhering to the ink discharging surface of the discharge head through the suction hole. Thus, the head facing surface and the suction hole of the ink sucking unit are contaminated with the ink. Accordingly, the ink sucking unit is cleaned as follows.

That is, the cleaning liquid is supplied to the head facing surface, and the auxiliary cleaning surface of the auxiliary cleaning member facing the head facing surface contacts this cleaning liquid. This causes the cleaning liquid to be spread on the head facing surface by the auxiliary cleaning surface. In this way, the cleaning liquid can be spread in a wide range of the head facing surface to clean the head facing surface. Further, the cleaning liquid spread on the head facing surface is sucked through the suction hole of the ink sucking unit. Thus, the suction hole can be cleaned by the cleaning liquid passing through the suction hole according to suction. In this way, both the head facing surface and the suction hole of the ink sucking unit can be reliably cleaned. On this occasion, the ink supplied to the head facing surface is removed through the suction hole of the ink sucking unit. That is, the suction hole has both a function of removing the ink from the discharge head and a function of removing the cleaning liquid from the head facing surface. Thus, it is not necessary to separately provide a mechanism for removing the cleaning liquid, and the ink sucking unit can be cleaned by a simple mechanism. In this way, the ink can be reliably removed from the ink sucking unit sucking the ink from the discharge head by a simple mechanism.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
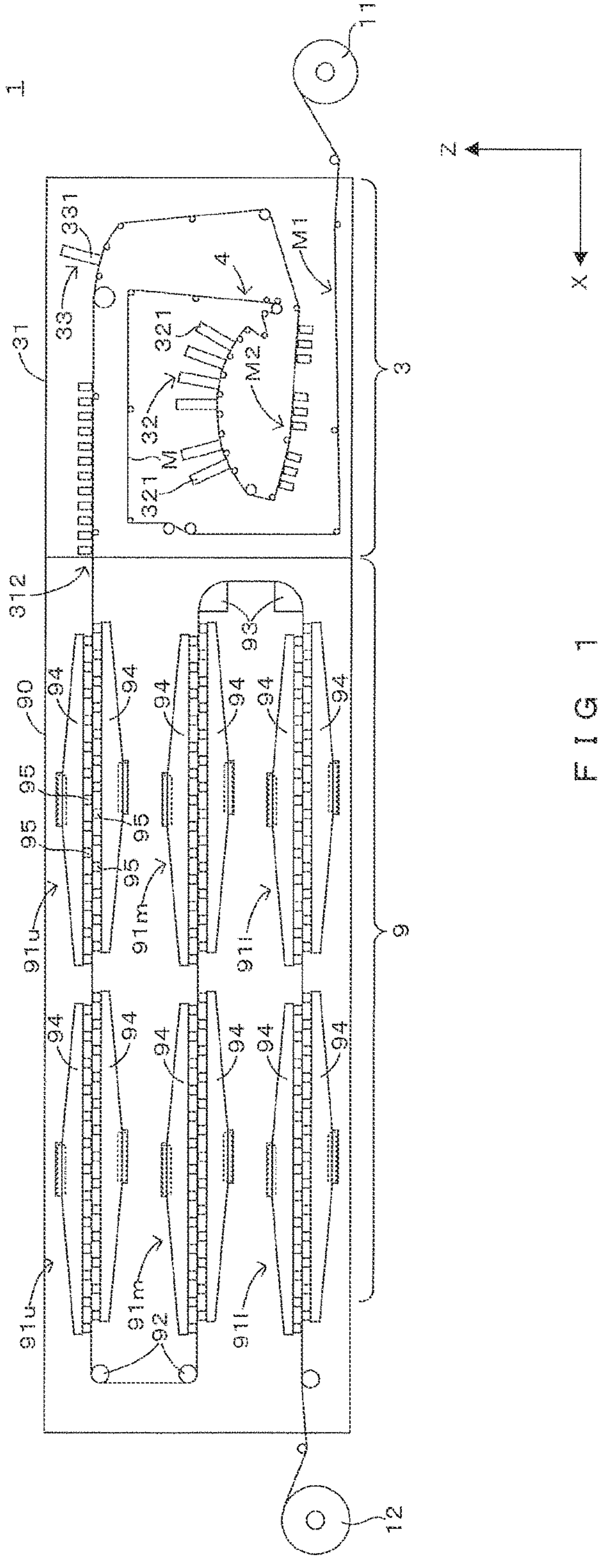
FIG. 1 is a front view schematically showing an example of a printing system provided with a printing apparatus according to the invention.

FIG. 1 is a front view schematically showing an example of a printing system provided with a printing apparatus according to the invention. In FIG. 1 and subsequent figures, a horizontal direction X and a vertical direction Z are shown as appropriate. As shown in FIG. 1, the printing system 1 includes a printing apparatus 3 and a drying apparatus 9 arrayed in the horizontal direction X. This printing system 1 conveys a printing medium M in the form of a long band in a roll-to-roll manner from a feeding roll 11 to a take-up roll 12. Note that a material of the printing medium M is a film of OPP (oriented polypropylene), PET (polyethylene terephthalate) or the like. However, the material of the printing medium M is not limited to the film and may be paper or the like. Such a printing medium M is flexible. Further, out of both surfaces of the printing medium M, a surface on which an image is printed is referred to as a front surface M1 and a surface opposite to the front surface M1 is referred to as a back surface M2 as appropriate.

The printing apparatus 3 prints an image on the front surface M1 of the printing medium M by discharging water-based inks to the front surface M1 of the printing medium M being conveyed from the feeding roll 11 to the take-up roll 12 in an ink-jet method. A detailed configuration of such a printing apparatus 3 is described later. The printing medium M having the image printed in this way is conveyed in the horizontal direction X from the printing apparatus 3 to the drying apparatus 9.

The drying apparatus 9 includes a drying furnace 90 and dries the printing medium M carried out from the printing apparatus 3 as the printing medium M is conveyed from the feeding roll 11 to the take-up roll 12. Two upper-stage blower units 91*u* arrayed in the horizontal direction X, two middle-stage blower units 91*m* arrayed in the horizontal direction X below these upper-stage blower units 91*u* and two lower-stage blower units 911 arrayed in the horizontal direction X below these middle-stage blower units 91*m* are provided in the drying furnace 90.

The printing medium M carried out through a carry-out port 312 of the printing apparatus 3 is folded toward the two middle-stage blower units 91*m* by one pair of rollers 92 after passing in the horizontal direction X through the two upper-stage blower units 91*u*. Subsequently, the printing medium M is folded toward the two lower-stage blower units 911 by one pair of air turn bars 93 after passing in the horizontal direction X through the two middle-stage blower units 91*m*. Further, the printing medium M is carried out to the outside of the drying apparatus 9 after passing in the horizontal direction X through the two lower-stage blower units 91.

The upper-stage blower unit 91*u* includes two blower chambers 94 arranged to sandwich the printing medium M passing in the horizontal direction X in the vertical direction Z. Each blower chamber 94 includes a plurality of nozzles 95 arrayed in the horizontal direction X and injects hot air (gas of 60° C. or higher) from the nozzles 95 to the printing medium M. In this way, the printing medium M is dried by the hot air injected from the nozzles 95 of these blower chambers 94 while passing between the two blower chambers 94 provided on upper and lower sides. Further, each of the middle-stage blower units 91*m* and the lower-stage blower units 911 also includes two blower chambers 94 for sandwiching the printing medium M in the vertical direction Z, similarly to the upper-stage blower units 91*u*.

By the way, a specific configuration of the upper-stage blower unit 91*u* is not limited to the one in this example. For example, a plurality of rollers arrayed in the horizontal direction X may be provided instead of the lower blower chamber 94, out of the upper and lower blower chambers 94 of the upper-stage blower unit 91*u*. In such a configuration, the hot air can be injected to the front surface M1 of the printing medium M from the upper blower chamber 94 while the back surface M2 of the printing medium M is supported from below by the plurality of rollers.

Figure 2:
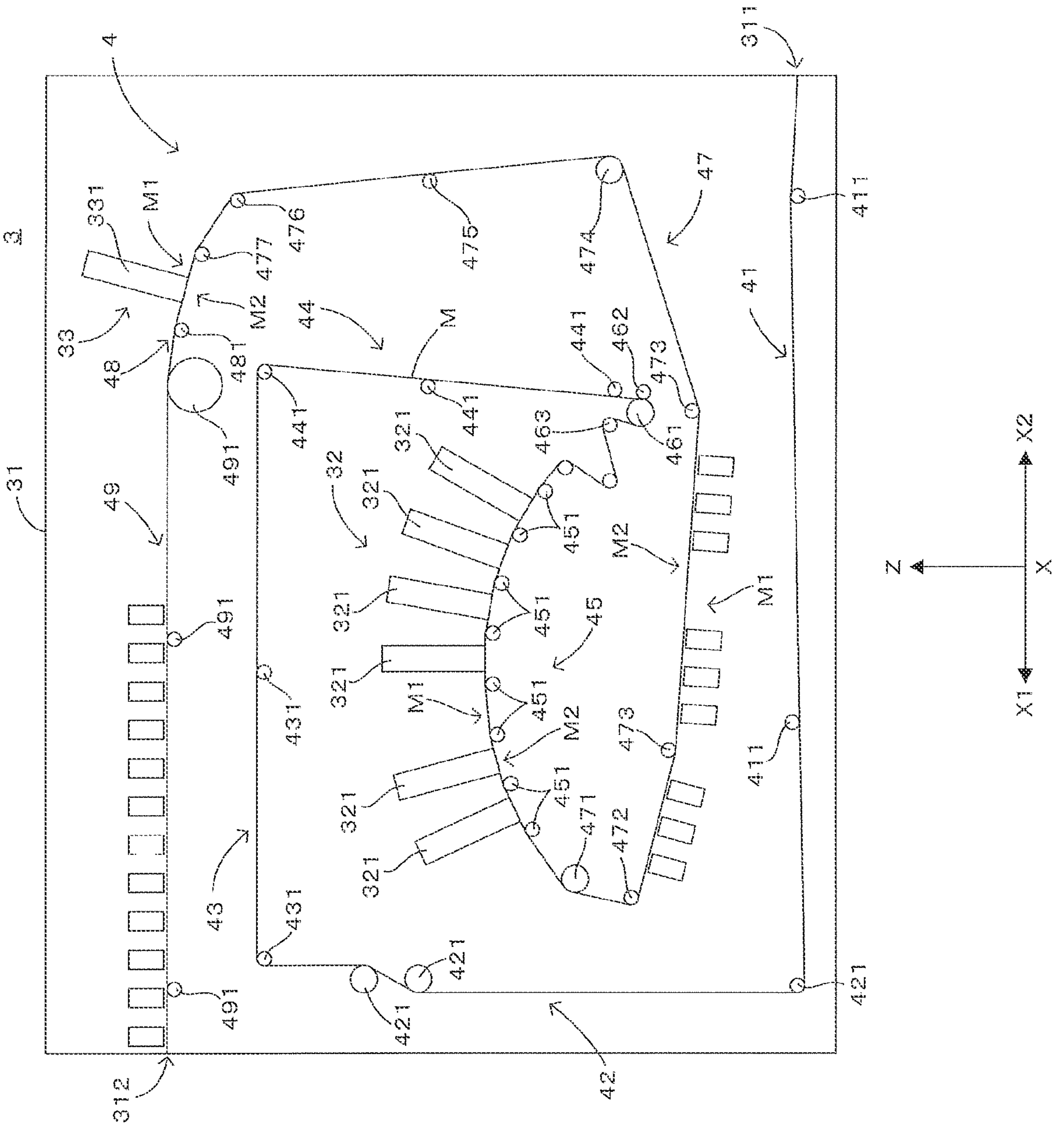
FIG. 2 is a front view schematically showing the printing apparatus equipped in the printing system of FIG. 1.

FIG. 2 is a front view schematically showing the printing apparatus equipped in the printing system of FIG. 1. In FIG. 2, one side X1 and another side X2 in the horizontal direction X are shown as appropriate. Here, the one side X1 is a side from the printing apparatus 3 toward the drying apparatus 9, and the other side X2 is a side opposite to the one side X1. The printing apparatus 3 includes a housing 31, a color printing unit 32 arranged in the housing 31, a white printing unit 33 arranged above the color printing unit 32 in the housing 31, and a conveyor 4 for conveying the printing medium M by a plurality of rollers arranged in the housing 31.

The color printing unit 32 includes a plurality of (six) head units 321 arrayed in a moving direction (direction from the other side X2 toward the one side X1) of the printing medium M above the printing medium M being conveyed by the conveyor 4. The plurality of head units 321 include nozzles facing the front surface M1 of the printing medium M passing therebelow from above, and discharge color inks having mutually different colors in the ink-jet method. Here, the color inks mean inks other than that having a white color and include inks of cyan, magenta, yellow, black and the like. In this way, the plurality of head units 321 of the color printing unit 32 print a color image on the front surface M1 of the printing medium M by discharging the color inks to the front surface M1 of the printing medium M passing therebelow from above.

Further, the white printing unit 33 includes a single head unit 331 arranged above the printing medium M being conveyed by the conveyor 4. The head unit 331 includes nozzles facing the front surface M1 of the printing medium M passing therebelow from above, and discharges a white ink from the nozzles in the ink-jet method. In this way, the head unit 331 of the white printing unit 33 prints a white image on the front surface M1 of the printing medium M by discharging the white ink to the front surface M1 of the printing medium M passing therebelow from above.

A carry-in port 311 is open in a side wall on the other side X2 of the housing 31, whereas a carry-out port 312 is open in a side wall on the one side X1 of the housing 31. The conveyor 4 conveys the printing medium M from the carry-in port 311 to the carry-out port 312 by way of the color printing unit 32 and the white printing unit 33 described above.

This conveyor 4 includes a carry-in part 41 provided below the color printing unit 32, an ascending conveyor 42 provided on the one side X1 of the color printing unit 32, an upper conveyor 43 provided above the color printing unit 32 and a descending conveyor 44 provided on the other side X2 of the color printing unit 32. The carry-in part 41 conveys the printing medium M carried in through the carry-in port 311 toward the one side X1 by rollers 411, the ascending conveyor 42 conveys the printing medium M conveyed by the carry-in part 41 upward by rollers 421, the upper conveyor 43 conveys the printing medium M conveyed by the ascending conveyor 42 toward the other side X2 by rollers 431, and the descending conveyor 44 conveys the printing medium M conveyed by the upper conveyor 43 downward by rollers 441.

Further, the conveyor 4 includes a color conveyor 45 for supporting the printing medium M facing the color printing unit 32 from below, and the printing medium M passed through the descending conveyor 44 enters the color conveyor 45. This color conveyor 45 includes a plurality of rollers 451 arrayed from the other side X2 to the one side X1 and each roller 451 contacts the back surface M2 of the printing medium M from below. In this way, the front surface M1 of the printing medium M supported by the color conveyor 45 is facing up and each head unit 321 of the color printing unit 32 discharges the color ink to this front surface M1 while facing this front surface M1 from above.

Further, the conveyor 4 includes rollers 461, 462 and 463 arranged between the color conveyor 45 and the descending conveyor 44 in the moving direction of the printing medium M. The roller 461 is a drive roller for driving the printing medium M. The rollers 462, 463 are driven rollers which rotate, following the printing medium M.

Furthermore, the conveyor 4 includes an inverting conveyor 47 for vertically inverting the printing medium M conveyed to the one side X1 from the color conveyor 45 twice. This inverting conveyor 47 includes a plurality of the rollers 471 to 477 including the drive roller 471, and these rollers 471 to 477 vertically invert the printing medium M twice while contacting the back surface M2 of the printing medium M. That is, the inverting conveyor 47 vertically inverts the front surface M1 and the back surface M2 of the printing medium M by conveying the printing medium M conveyed from the color conveyor 45 downward by the rollers 471, 472 and further conveying the printing medium M with the moving direction of the printing medium M changed to the one toward the other side X2 by the roller 472. Subsequently, the inverting conveyor 47 conveys the printing medium M from the one side X1 to the other side X2 by a plurality of the rollers 473 and then conveys the printing medium M upward by the rollers 474 to 476. Further, the inverting conveyor 47 vertically inverts the front surface M1 and the back surface M2 of the printing medium M again and conveys the printing medium M from the other side X2 to the one side X1 by the roller 477 by changing the moving direction of the printing medium M toward the one side X1 by the roller 476.

Further, the conveyor 4 includes a white conveyor 48 for supporting the printing medium M facing the white printing unit 33 from below, and the printing medium M vertically inverted twice by the inverting conveyor 47 enters the white conveyor 48. This white conveyor 48 includes a roller 481 configured to contact the back surface M2 of the printing medium M from below. In this way, the front surface M1 of the printing medium M supported by the white conveyor 48 is facing up, and the head unit 331 of the white printing unit 33 discharges the white ink to this front surface M1 while facing this front surface M1 from above.

Further, the conveyor 4 includes a carry-out part 49 provided above the upper conveyor 43. The carry-out part 49 includes a plurality of rollers 491 arrayed from the other side X2 to the one side X1 in the horizontal direction X. This carry-out part 49 conveys the printing medium M conveyed by the white conveyor 48 to the drying apparatus 9 through the carry-out port 312 of the housing 31 by conveying the printing medium M to the one side X1 by the plurality of rollers 491.

As described above, the color printing unit 32 and the white printing unit 33 of the printing apparatus 3 include the head units 321, 331. Next, these head units 321, 331 are described. Note that each head unit 321, 331 has a common basic configuration. Accordingly, one head unit 321 is described below and the other head units 321, 331 are not described. Further, discharge heads H of the head unit 321 are slightly inclined according to the posture of the printing medium M. However, since the inclination of the discharge heads H is slight, the discharge heads H are not shown to be inclined in figures to be described below.

Figure 3A:
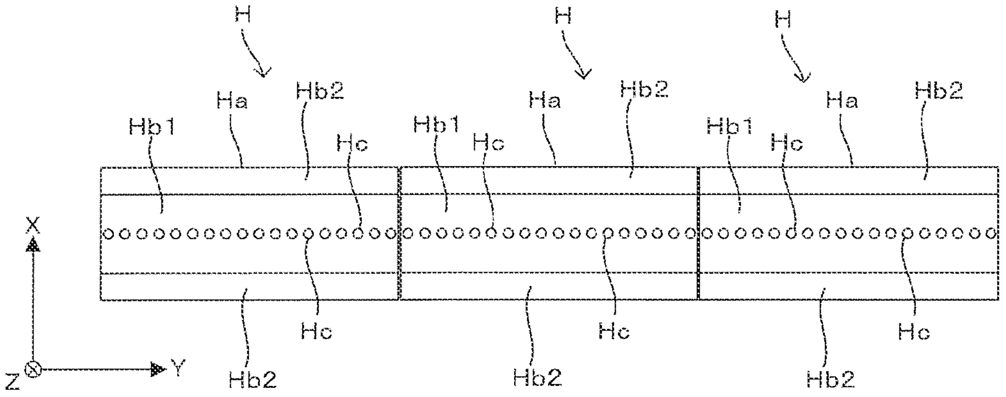
FIG. 3A is a bottom view schematically showing the bottom surface of the head unit.
Figure 3B:
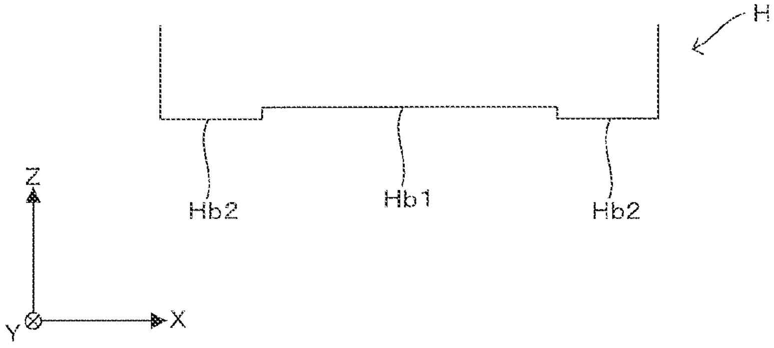
FIG. 3B is a side view schematically showing a side surface of the head unit.

FIG. 3A is a bottom view schematically showing the bottom surface of the head unit and FIG. 3B is a side view schematically showing a side surface of the head unit. In FIGS. 3A and 3B, a horizontal direction Y orthogonal to the horizontal direction X is shown in addition to the horizontal direction X and the vertical direction Z. As shown in FIG. 3A, a plurality of the discharge heads H discharging the ink of the same color are arrayed in a row in the horizontal direction Yin the head unit 321. Note that an array mode of the discharge heads H is not limited to an example of FIG. 3A and the plurality of discharge heads H may be arrayed in a staggered manner.

This discharge head H has a housing Ha and the bottom surface of the housing Ha has an ink discharging flat surface Hb1 and projecting flat surfaces Hb provided on both sides of the ink discharge flat surface Hb1 in the horizontal direction X. The ink discharging flat surface Hb1 and the projecting flat surfaces Hb2 are parallel to each other and facing the front surface M1 of the printing medium M. As shown in FIG. 3B, the two projecting flat surfaces Hb2 arranged in the horizontal direction X are located at the same height (in other words, flush with each other). On the other hand, the ink discharging flat surface Hb1 is located higher than the two projecting flat surfaces Hb2. That is, the two projecting flat surfaces Hb2 project further downward than the ink discharging flat surface Hb1 between these two projecting flat surfaces Hb2. These projecting flat surfaces Hb2 are, for example, made of glass fiber.

A plurality of nozzles Hc are arrayed in the horizontal direction Y and open in this ink discharging flat surface Hb1. Note that, although the plurality of nozzles Hc are arrayed in a row in the example of FIG. 3A, an array mode of these nozzles He is not limited to this example and the nozzles He may be, for example, arrayed in a staggered manner in the horizontal direction Y. Each nozzle He provided in the ink discharging flat surface Hb1 in this way discharges the ink toward the front surface M1 of the printing medium M. Note that the ink can be discharged by various ink-jet techniques such as a piezo technique or thermal technique.

Further, the printing apparatus 3 includes a maintenance unit 51 (FIGS. 4A, 4C and 5) performing maintenance for the respective discharge heads H. Next, the maintenance unit 51 is described. Note that the maintenance unit 51 is arranged for each of the plurality of head units 321, 331 and the configuration and operation of the maintenance unit 51 provided in each head unit 321, 331 are common. Thus, one maintenance unit 51 is described here. Further, the maintenance unit 51 is slightly inclined according to the posture of the head unit 321 or 331 to be cleaned. However, since the inclination of the maintenance unit 51 is slight, the maintenance unit 51 is not shown to be inclined in figures to be described below.

Figure 4A:
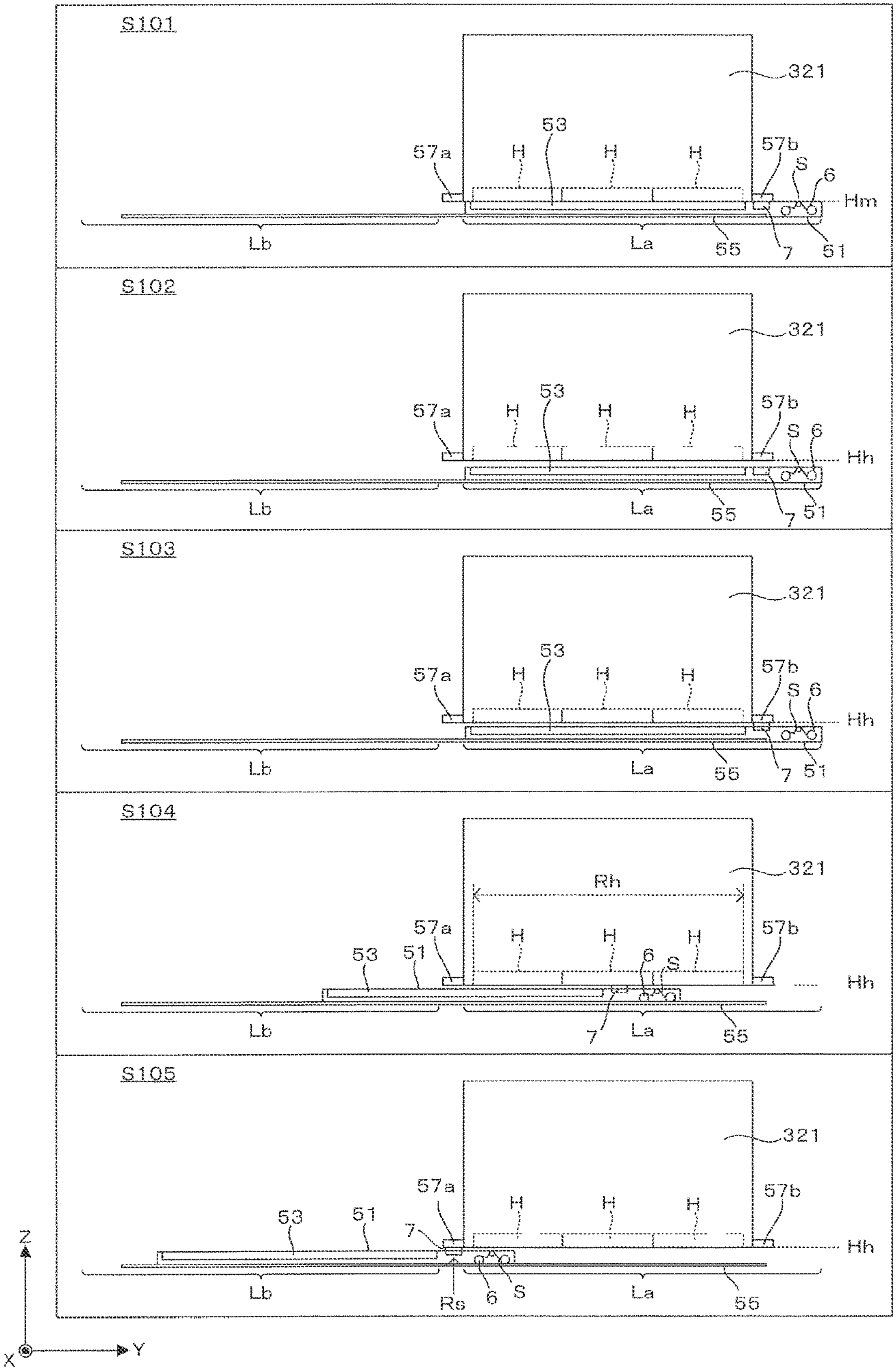
FIG. 4A is a diagram schematically showing examples of head suction cleaning and self-cleaning performed by the maintenance unit.
Figure 4B:
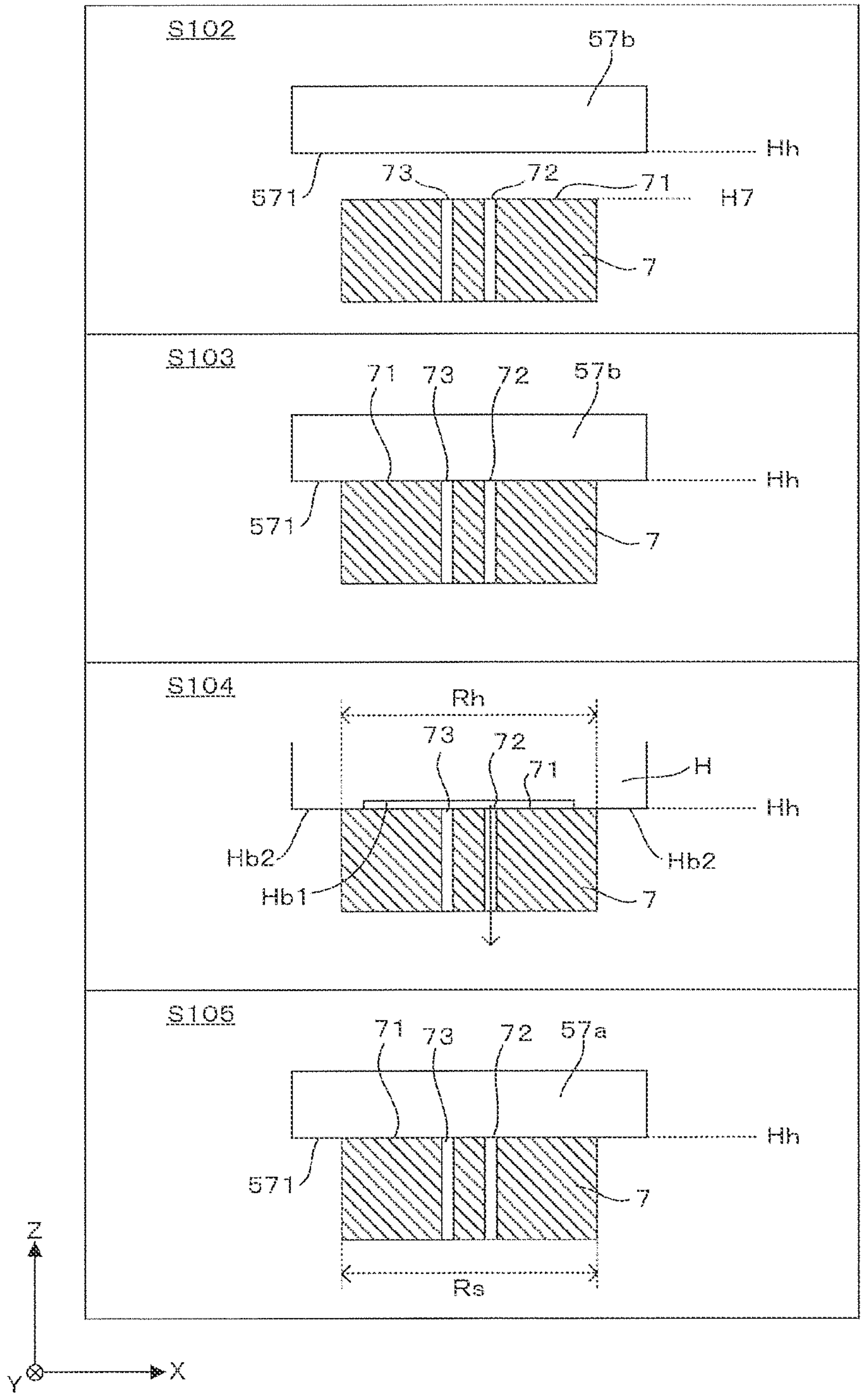
FIG. 4B is a diagram schematically showing the details of operations performed in FIG. 4A.
Figure 4C:
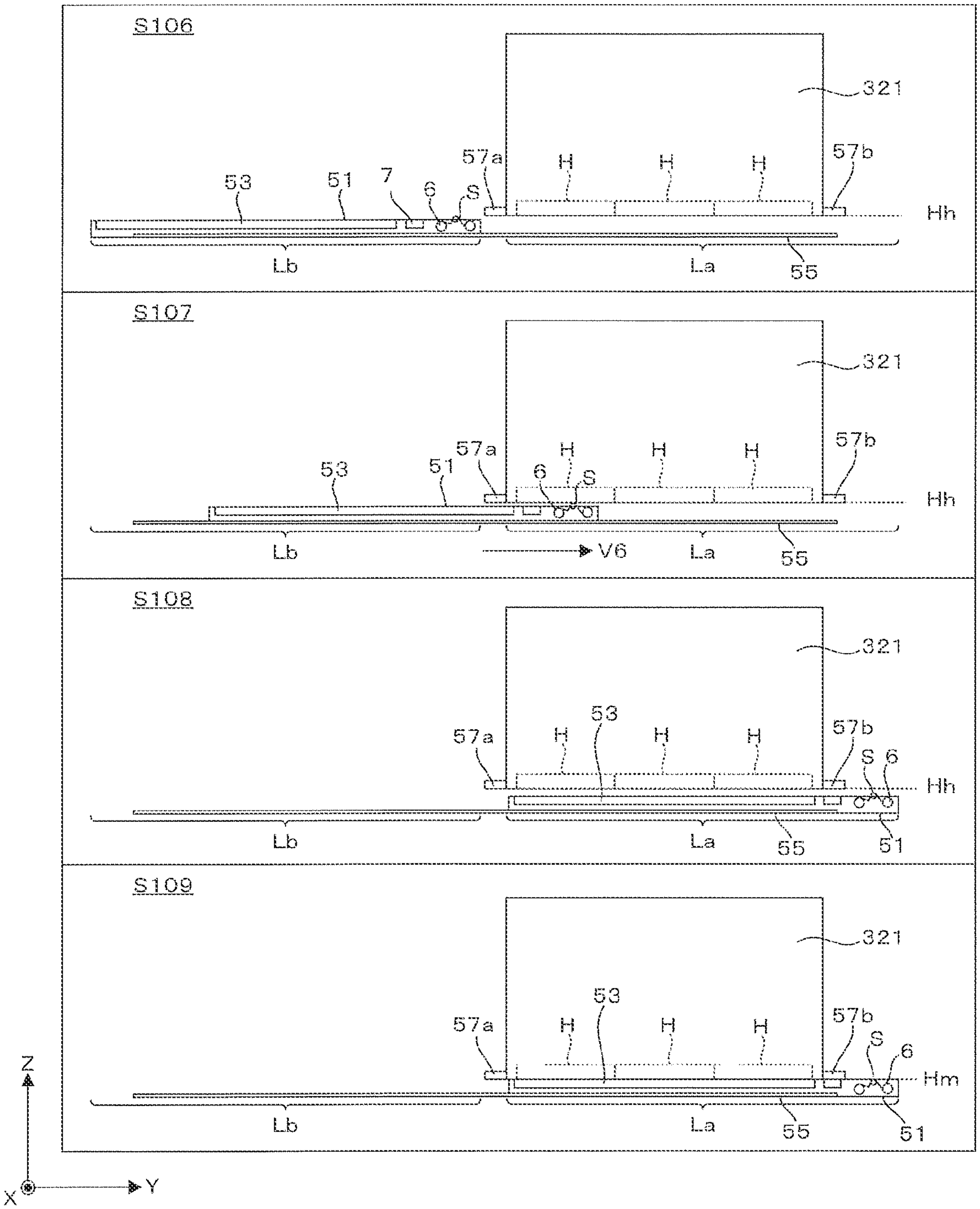
FIG. 4C is a diagram schematically showing an example of head wipe cleaning performed by the maintenance unit.
Figure 5:
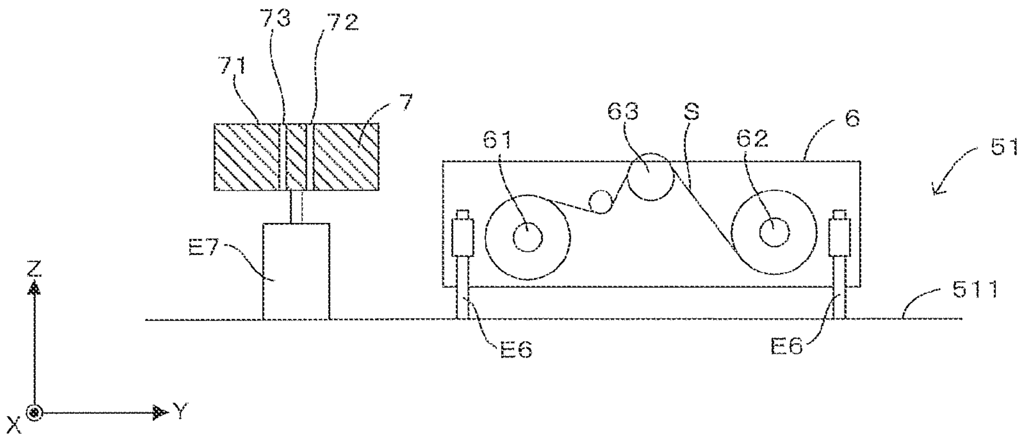
FIG. 5 is a diagram schematically showing the configuration of a part of the maintenance unit.
Figure 6:
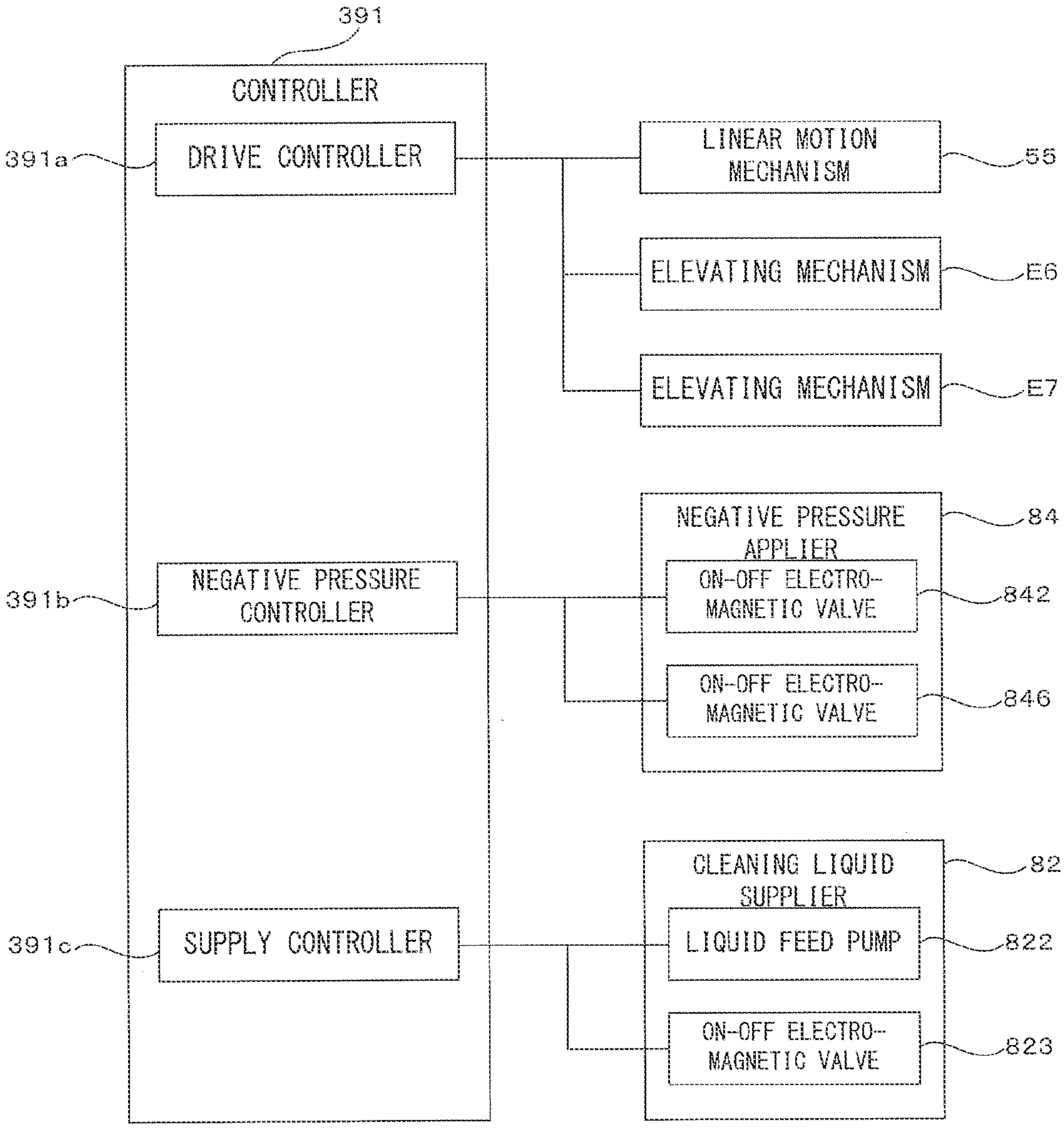
FIG. 6 is a block diagram showing an electrical configuration provided in the printing apparatus to control the maintenance unit.

FIG. 4A is a diagram schematically showing examples of head suction cleaning and self-cleaning performed by the maintenance unit, FIG. 4B is a diagram schematically showing the details of operations performed in FIG. 4A, FIG. 4C is a diagram schematically showing an example of head wipe cleaning performed by the maintenance unit, FIG. 5 is a diagram schematically showing the configuration of a part of the maintenance unit and FIG. 6 is a block diagram showing an electrical configuration provided in the printing apparatus to control the maintenance unit.

As shown in FIGS. 4A and 4C, the printing apparatus 3 is provided with the maintenance unit 51 and a linear motion mechanism 55 driving the maintenance unit 51 in the horizontal direction Y. This linear motion mechanism 55 includes, for example, a ball screw or a linear motor and moves the maintenance unit 51 between a facing position La and a retracted position Lb provided at an interval from the facing position La in the horizontal direction Y. The maintenance unit 51 located at the facing position La faces the plurality of discharge heads H, whereas the maintenance unit 51 located at the retracted position Lb does not face the plurality of discharge heads H. Further, to avoid interference with the maintenance unit 51, the plurality of discharge heads H can be integrally raised and lowered. Particularly, the plurality of discharge heads H are located at any one of a printing height Hl, a cap height Hm higher than the printing height Hl and a retracted height Hh higher than the cap height Hm. Note that the heights Hl, Hm and Hh are represented by heights of the lower end surfaces of the discharge heads H, i.e. the projecting flat surfaces Hb2.

Further, as shown in FIGS. 4A and 4C, dummy blocks 57*a*, 57*b* are provided on both sides of the head unit 321 in the horizontal direction Y. The dummy blocks 57*a*, 57*b* have the same configuration and are, for example, made of polyacetal. These dummy blocks 57*a*, 57*b* are mounted on the head unit 321 and raised and lowered integrally with the head unit 321. Further, the dummy block 57*a*, 57*b* has a dummy flat surface 571 (FIG. 4B) on the bottom surface thereof. This dummy flat surface 571 is a flat surface parallel to the projecting flat surfaces Hb2 of the discharge heads H and is at the same height as the projecting flat surfaces Hb2 of the discharge heads H. That is, the dummy flat surfaces 571 of the dummy blocks 57*a*, 57*b* and the projecting flat surfaces Hb2 of the discharge heads H are flush with each other.

The maintenance unit 51 includes a cap 53, a wiping unit 6 and a suction block 7. The cap 53 performs capping to cover the discharge heads H from below. As shown in FIG. 5, the wiping unit 6 includes a feeding roller 61 and a take-up roller 62 arrayed at an interval in the horizontal direction Y, and conveys a sheet S in a roll-to-roll manner from the feeding roller 61 to the take-up roller 62. Further, the wiping unit 6 includes a wiping roller 63 held in contact with the sheet S from below between the feeding roller 61 and the take-up roller 62. This wiping unit 6 wipes off the ink adhering to the ink discharging flat surfaces Hb1 by the sheet S by conveying the sheet S while sandwiching the sheet S between the wiping roller 63 and the ink discharging flat surfaces Hb1 of the discharge heads H (head wipe cleaning). A cloth in the form of a long band is used as the sheet S. However, a material of the sheet S is not limited to the cloth and may be, for example, paper.

Further, the maintenance unit 51 includes an elevating mechanism E6 raising and lowering the wiping unit 6 with respect to a housing 511 of the maintenance unit 51. Specifically, the elevating mechanism E6 raises the wiping unit 6 when the wiping unit 6 performs the head wipe cleaning, whereas the elevating mechanism E6 lowers the wiping unit 6 when the wiping unit 6 does not perform the head wipe cleaning. An actuator or the like can be used as such an elevating mechanism E6.

The suction block 7 is arranged between the cap 53 and the wiping unit 6 in the horizontal direction Y. This suction block 7 has a head facing flat surface 71 on the upper surface thereof. The head facing flat surface 71 is a flat surface parallel to the dummy flat surfaces 571 of the dummy blocks 57*a*, 57*b* and the projecting flat surfaces Hb2 of the discharge heads H. Further, the suction block 7 includes suction holes 72 and supply holes 73 open in the head facing flat surface 71. The suction holes 72 suck the ink and a cleaning liquid from the head facing flat surface 71 by a negative pressure applied by a cleaning unit 8 (FIG. 6), and the supply holes 73 discharge the cleaning liquid supplied from the cleaning unit 8 to the head facing flat surface 71.

Further, the maintenance unit 51 includes an elevating mechanism E7 raising and lowering the suction block 7 with respect to the housing 511 of the maintenance unit 51. Specifically, the elevating mechanism E7 raises the suction block 7 when the suction block 7 performs head suction cleaning or self-cleaning described later, whereas the elevating mechanism E7 lowers the suction block 7 when the suction block 7 does not perform theses cleanings. An actuator or the like can be used as such an elevating mechanism E7.

As shown in FIG. 6, the printing apparatus 3 includes a controller 391 having a processor such as a CPU (Central Processing Unit). FIG. 6 also shows respective functional parts of the controller 391. The controller 391 includes a drive controller 391*a*, a negative pressure controller 391*b* and a supply controller 391*c*. The drive controller 391*a* controls the operation of the liner motion mechanism 55 to move the maintenance unit 51 between the facing position La and the retracted position Lb provided at an interval from the facing position La in the horizontal direction Y. Further, the drive controller 391*a* controls the operation of the elevating mechanism E6 to raise and lower the wiping unit 6 with respect to the housing 511 of the maintenance unit 51. Furthermore, the drive controller 391*a* controls the operation of the elevating mechanism E7 to raise and lower the suction block 7 with respect to the housing 511 of the maintenance unit 51. The negative pressure controller 391*b* controls opening and closing operations of an on-off electromagnetic valve 842 and an on-off electromagnetic valve 846 included in a negative pressure applier 84 to be described later to apply a negative pressure to the suction holes 72 formed in the suction block 7 and stop applying the negative pressure. The supply controller 391*c* controls a supplying operation of a liquid feed pump to be described later and opening and closing operations of an on-off electromagnetic valve 823 to supply the cleaning liquid to the supply holes 73 formed in the suction block 7 and stop the supply. Operations shown in FIGS. 4A to 4C are performed by the drive controller 391*a*, the negative pressure controller 391*b* and the supply controller 391*c* respectively controlling the operations of the linear motion mechanism 55, the elevating mechanism E6, the elevating mechanism E7, the on-off electromagnetic valve 842, the on-off electromagnetic valve 846, the liquid feed pump 822 and the on-off electromagnetic valve 823 included in and the cleaning unit 8.

In Step S101 of FIG. 4A, the maintenance unit 51 is located at the facing position La and the head unit 321 is located at the cap height Hm. Accordingly, the cap 53 of the maintenance unit 51 comes into contact with the head unit 321 to cover the plurality of discharge heads H from below (capping). In contrast, the wiping unit 6 and the suction block 7 are projecting toward a side opposite to the retracted position Lb from the head unit 321 in the horizontal direction Y.

In Step S102, the head unit 321 is raised from the cap height Hm to the retracted height Hh. In this way, the plurality of discharge heads H and the cap 53 are separated and capping is released. On the other hand, the head facing flat surface 71 of the suction block 7 is located at a standby position H7 (FIG. 4B) lower than the retracted height Hh. That is, the head facing flat surface 71 of the suction block 7 is located lower than the dummy flat surface 571 of the dummy block 57*b*.

In Step S103, the drive controller 391*a* controls the linear motion mechanism 55 to adjust the position of the suction block 7 in the horizontal direction Y, whereby the positions of the head facing flat surface 71 of the suction block 7 and the dummy flat surface 571 of the dummy block 57*b* are aligned in the horizontal direction Y Then, the drive controller 391*a* controls the elevating mechanism E7 to raise the suction block 7. In this way, the head facing flat surface 71 of the suction block 7 is raised from the standby position H7 to the retracted height Hh and comes into contact with the dummy flat surface 571 of the dummy block 57*b*.

In Step S104, the drive controller 391*a* controls the linear motion mechanism 55 to start a movement of the maintenance unit 51 from the facing position La to the retracted position Lb in the horizontal direction Y. In this way, the suction block 7 moves toward the facing position La in a head cleaning region Rh facing the ink discharging flat surfaces Hb1 of the discharge heads H. While the suction block 7 is moving in the head cleaning region Rh, the head facing flat surface 71 of the suction block 7 is facing the ink discharging flat surfaces Hb1 and the projecting flat surfaces Hb2 from below and located at the same retracted height Hh as the projecting flat surfaces Hb2 of the discharge heads H. Accordingly, while both ends of the head facing flat surface 71 are contacting the projecting flat surfaces Hb2, the suction block 7 moves with the suction holes 72 and the supply holes 73 provided in a center (range between the both ends) of the head facing flat surface 71 facing the ink discharging flat surfaces Hb1. Further, while the suction block 7 is moving in the head cleaning region Rh, the negative pressure controller 391*b* controls to activate the negative pressure applier 84 to be described later, thereby controlling to open the on-off electromagnetic valve 842 and the on-off electromagnetic valve 846 included in the negative pressure applier 84. As a result, a negative pressure is applied to the suction holes 72 formed in the suction block 7 and the suction holes 72 suck. In this way, the ink adhering to the ink discharging flat surfaces Hb1 of the discharge heads H is sucked through the suction holes 72 and the ink is removed from the discharge heads H (head suction cleaning).

In Step S105, the drive controller 391*a* controls the linear motion mechanism 55 such that the suction block 7 having passed through the head cleaning region Rh stops in a self-cleaning region Rs facing the dummy flat surface 571 of the dummy block 57*a*. In this way, the head facing flat surface 71 of the suction block 7 contacts the dummy flat surface 571 of the dummy block 57*a* from below. Then, the negative pressure controller 391*b* controls to activate the negative pressure applier 84 to be described later and the supply controller 391*c* controls a cleaning liquid supplier 82 to be described later to supply the cleaning liquid to the head facing flat surface 71. In this way, the suction block 7 removes the ink adhering to the head facing flat surface 71 and the suction holes 72 by performing the self-cleaning to be described in detail later.

When the self-cleaning of Step S105 is completed, the drive controller 391*a* controls the linear motion mechanism 55 to move the maintenance unit 51 to the retracted position Lb, controls the operation of the elevating mechanism E7 to lower the suction block 7 from the retracted height Hh to the standby position H7 and controls the operation of the elevating mechanism E6 to raise the wiping unit 6 as shown in Step S106 of FIG. 4C.

In Step S107, the drive controller 391*a* controls the linear motion mechanism 55 to start a movement of the maintenance unit 51 from the retracted position Lb to the facing position La. When the sheet S contacts the ink discharging flat surface Hb1 of the discharge head H, the wiping unit 6 starts the conveyance of the sheet S in a roll-to-roll manner while continuing to move in the horizontal direction Y. In this way, the ink adhering to the ink discharging flat surfaces Hb is wiped off by the sheet S (head wipe cleaning).

When the maintenance unit 51 reaches the facing position La (Step S108), the cap 53 of the maintenance unit 51 faces the plurality of discharge heads H from below. On the other hand, the wiping unit 6 and the suction block 7 stop at positions projecting from the plurality of discharge heads H in the horizontal direction Y. Subsequently, the plurality of discharge heads H are lowered from the retracted height Hh to the cap height Hm (Step S109). In this way, the respective discharge heads H are covered from below by the cap 53 (capping).

Figure 7:
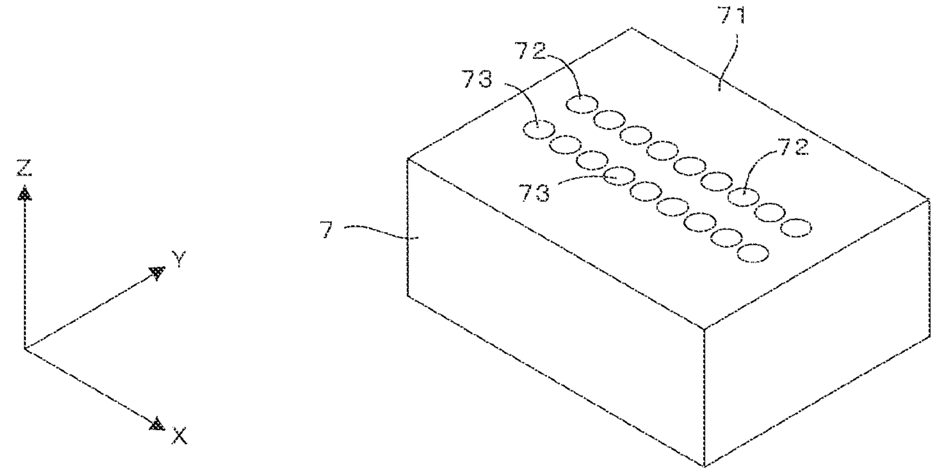
FIG. 7 is a perspective view schematically showing the appearance configuration of the suction block.
Figure 8:
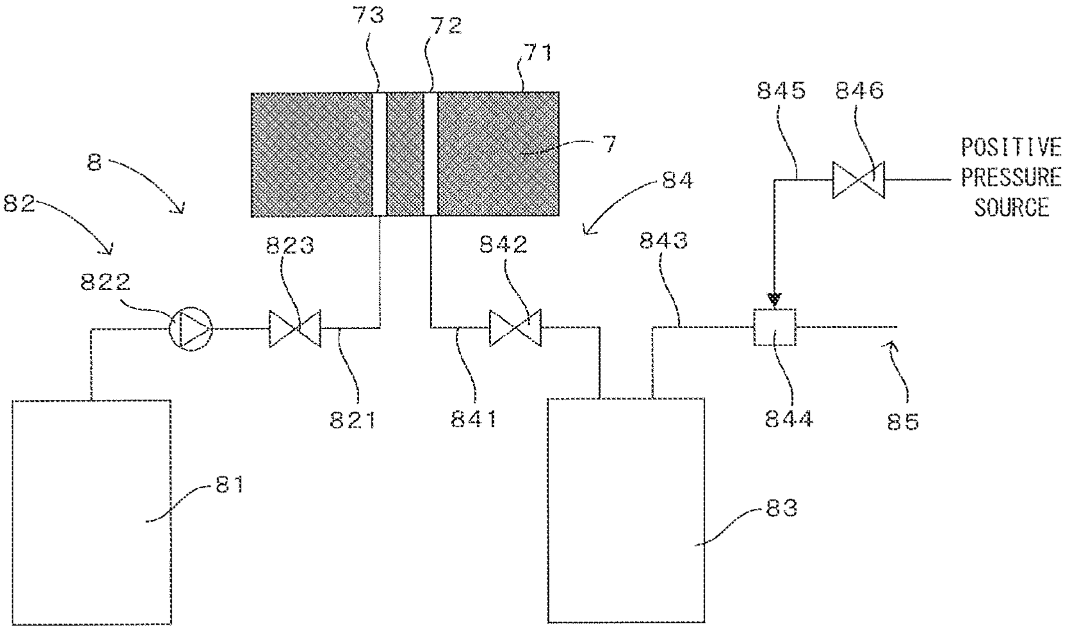
FIG. 8 is a diagram schematically showing the configuration of the cleaning unit for supplying the negative pressure and the cleaning liquid necessary for a cleaning operation by the suction block.

Subsequently, the configuration and operation for the head suction cleaning and self-cleaning performed by the suction block 7 are described in detail. FIG. 7 is a perspective view schematically showing the appearance configuration of the suction block, and FIG. 8 is a diagram schematically showing the configuration of the cleaning unit 8 for supplying the negative pressure and the cleaning liquid necessary for a cleaning operation by the suction block.

As shown in FIG. 7, a plurality of the suction holes 72 are arranged in a row in the horizontal direction X and a plurality of the supply holes 73 are arranged in a row in the horizontal direction X in the head facing flat surface 71 of the suction block 7.

. However, an array mode of the suction holes 72 and the supply holes 73 are not limited to this example and the suction holes 72 and the supply holes 73 may be alternately arrayed. Alternatively, the suction holes 72 and the supply holes 73 may be arrayed not in the horizontal direction X, but in the horizontal direction Y.

The cleaning unit 8 can supply the negative pressure to the suction holes 72 and supply the cleaning liquid to the supply holes 73. This cleaning unit 8 includes the cleaning liquid supplier 82. This cleaning liquid supplier 82 includes a cleaning liquid tank 81, and the cleaning liquid tank 81 stores the cleaning liquid. This cleaning liquid contains, for example, components other than coloring components (pigments, dyes), out of ink components. Further, the cleaning liquid supplier 82 includes a pipe 821 connecting the cleaning liquid tank 81 and the supply holes 73, the liquid feed pump 822 mounted in the pipe 821 and the on-off electromagnetic valve 823 mounted in the pipe 821 between the liquid feed pump 822 and the supply holes 73. The supply controller 391*c* controls a liquid feed operation of the liquid feed pump 822 and opening and closing operations of the on-off electromagnetic valve 823. With the on-off electromagnetic valve 823 opened, the liquid feed pump 822 supplies the cleaning liquid from the cleaning liquid tank 81 to the supply holes 73 via the pipe 821 by a control of the supply controller 391*c*. Further, the supply of the cleaning liquid to the supply holes 73 can be stopped by stopping the liquid feed pump 822 or closing the on-off electromagnetic valve 823.

Further, the cleaning unit 8 includes the negative pressure applier 84. The negative pressure applier 84 includes a sucked liquid trap tank 83, a pipe 841 connecting the sucked liquid trap tank 83 and the suction holes 72, the on-off electromagnetic valve 842 mounted in the pipe 841, a pipe 843 connecting the sucked liquid trap tank 83 and an exhaust port 85, an ejector 844 mounted in the pipe 843, a pipe 845 connecting the ejector 844 and a positive pressure source and the on-off electromagnetic valve 846 mounted in the pipe 845. The negative pressure controller 391*b* controls opening and closing operations of the on-off electromagnetic valve 842 and the on-off electromagnetic valve 846. If a positive pressure from the positive pressure source is supplied to the ejector 844 by opening the on-off electromagnetic valve 846, the ejector 844 generates a negative pressure according to the supply of the positive pressure and discharges gas (air) in the sucked liquid trap tank 83 to the exhaust port 85. In this way, a negative pressure is generated in the sucked liquid trap tank 83. Accordingly, with the on-off electromagnetic valve 842 opened, the negative pressure in the sucked liquid trap tank 83 is supplied to the suction holes 72 via the pipe 841. The liquid (ink/cleaning liquid) sucked by the negative pressure by the suction holes 72 is trapped in the sucked liquid trap tank 83 via the pipe 841. On the other hand, by closing at least one of the on-off electromagnetic valve 842 and the on-off electromagnetic valve 846, the supply of the negative pressure to the suction holes 72 can be stopped. As just described, the negative pressure controller 391*b* applies the negative pressure to the suction holes 72 of the head facing flat surface 71 by controlling to activate the negative pressure applier 84 and open the on-off electromagnetic valve 842 and the on-off electromagnetic valve 846. On the other hand, the negative pressure controller 391*b* can inactivate the negative pressure applier 84 and stop the supply of the negative pressure to the suction holes 72 by controlling to close at least one of the on-off electromagnetic valve 842 and the on-off electromagnetic valve 846 included in the negative pressure applier 84.

The supply controller 391*c* controls the liquid feed pump 822 and the on-off electromagnetic valve 823 and the negative pressure controller 391*b* controls the on-off electromagnetic valve 842 and the on-off electromagnetic valve 846, thereby supplying the cleaning liquid to the supply holes 73 and supplying the negative pressure to the suction holes 72. For example, during the execution of the head suction cleaning in Step S104 described above, the ink adhering to the ink discharging flat surfaces Hb1 is sucked through the suction holes 72 and collected into the sucked liquid trap tank 83 by applying the negative pressure to the suction holes 72 while the supply of the cleaning liquid to the supply holes 73 is stopped. Further, an operation shown in FIG. 9 to be described later is performed in the self-cleaning in Step S105.

Figure 9:
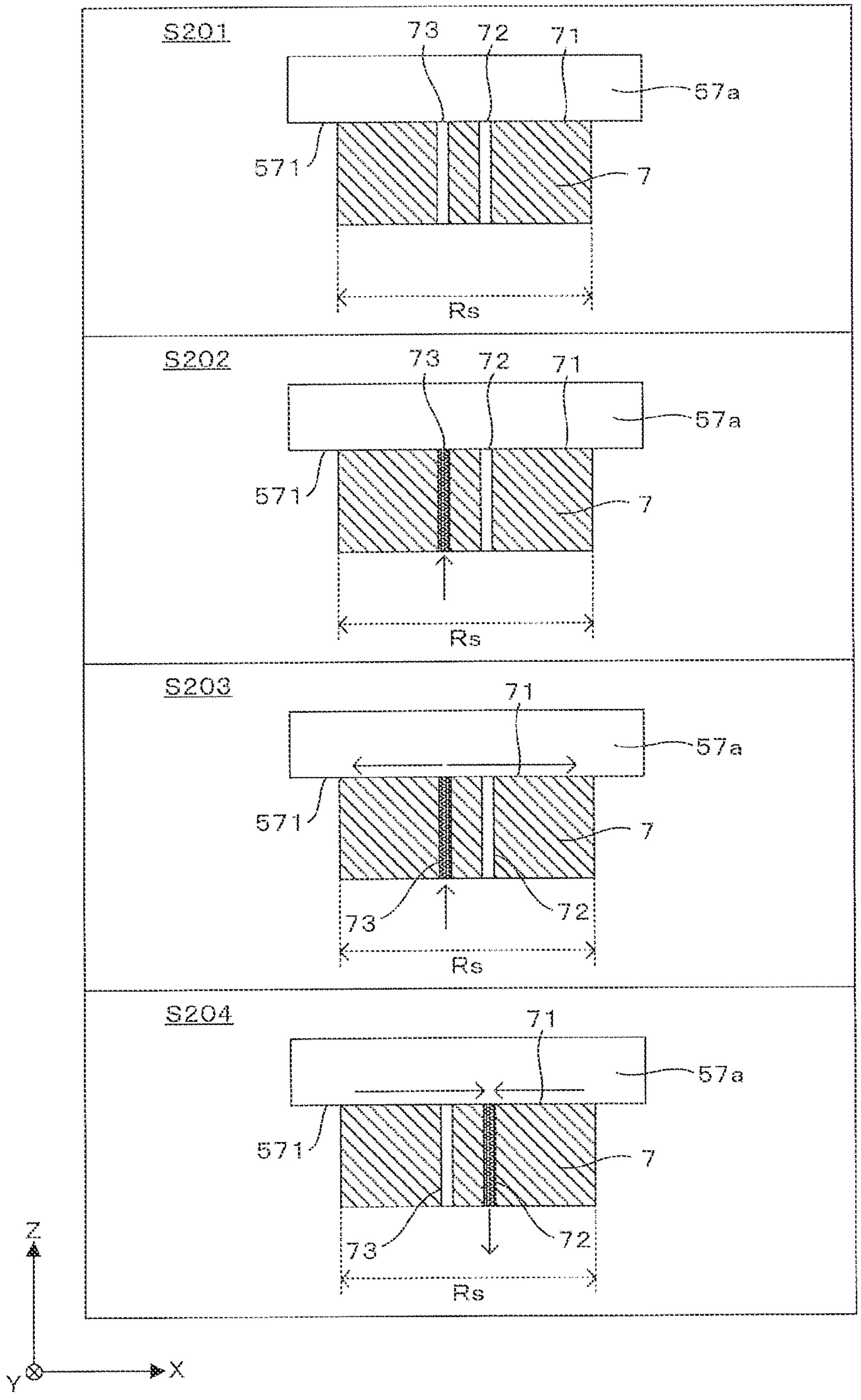
FIG. 9 is a diagram schematically showing an example of the self-cleaning performed by the suction block.

FIG. 9 is a diagram schematically showing an example of the self-cleaning performed by the suction block. As described above, the dummy block 57*a* is located in the self-cleaning region Rs according to the start of the self-cleaning (Step S201). In this way, the head facing flat surface 71 of the suction block 7 contacts the dummy flat surface 571 of the dummy block 57*a* from below and covered by the dummy flat surface 571. Further, in this Step S201, the supply of the cleaning liquid to the supply holes 73 and the supply of the negative pressure to the suction holes 72 are stopped.

In Step S202, the supply of the cleaning liquid to the supply holes 73 is started. In this way, the cleaning liquid discharged from the supply holes 73 is supplied to the head facing flat surface 71. On the other hand, the dummy flat surface 571 of the dummy block 57*a* is in contact with the head facing flat surface 71 and the cleaning liquid supplied to the head facing flat surface 71 contacts the dummy flat surface 571. Thus, the cleaning liquid supplied to the head facing flat surface 71 is spread along the head facing flat surface 71 by the dummy flat surface 571 as indicated by arrows of Step S203.

When the supply of the cleaning liquid to the supply holes 73 is stopped, the application of the negative pressure to the suction holes 72 is started (Step S204). This causes the cleaning liquid supplied to the head facing flat surface 71 to be sucked by the suction holes 72 and collected into the sucked liquid trap tank 83. In this way, the cleaning liquid is removed from the head facing flat surface 71. Incidentally, the application of the negative pressure may be started before the supply of the cleaning liquid is stopped. According to such an operation, there is a period during which the cleaning liquid is sucked from the head facing flat surface 71 while the cleaning liquid is supplied to the head facing flat surface 71. In this case, the supply of the negative pressure may be stopped after being continued for a predetermined time following the stop of the supply of the cleaning liquid.

In the embodiment described above, the suction block 7 (ink sucking unit) has the head facing flat surface 71 (head facing surface) in which the suction holes 72 are open, and the ink is removed from the discharge heads H by sucking the ink adhering to the ink discharging flat surfaces Hb1 (ink discharging surfaces) of the discharge heads H through the suction holes 72 (head suction cleaning of Step S104). Thus, the head facing flat surface 71 and the suction holes 72 of the suction block 7 are contaminated with the ink. Accordingly, the suction block 7 is cleaned as follows.

That is, the cleaning liquid is supplied to the head facing flat surface 71, and the dummy flat surface 571 (auxiliary cleaning surface) of the dummy block 57*a* (auxiliary cleaning member) facing the head facing flat surface 71 contacts the cleaning liquid. This causes the cleaning liquid to be spread on the head facing flat surface 71 by the dummy flat surface 571. In this way, the cleaning liquid can be spread in a wide range of the head facing flat surface 71 to clean the head facing flat surface 71. Further, the cleaning liquid spread on the head facing flat surface 71 is sucked through the suction holes 72 of the suction block 7. Thus, the suction holes 72 can be cleaned by the cleaning liquid passing through the suction holes 72 according to suction. In this way, both the head facing flat surface 71 and the suction holes 72 of the suction block 7 can be reliably cleaned. On this occasion, the ink supplied to the head facing flat surface 71 is removed through the suction holes 72 of the suction block 7. That is, the suction holes 72 have both a function of removing the ink from the discharge heads H and a function of removing the cleaning liquid from the head facing flat surface 71. Thus, it is not necessary to separately provide a mechanism for removing the cleaning liquid and the suction block 7 can be cleaned by a simple mechanism. In this way, the ink can be reliably removed from the suction block 7 sucking the ink from the discharge heads H by a simple mechanism.

Further, the supply holes 73 are open in the head facing flat surface 71 and the cleaning liquid supplier 82 supplies the cleaning liquid to the head facing flat surface 71 through the supply holes 73. In such a configuration, the cleaning liquid is supplied through the supply holes 73 open in the head facing flat surface 71 of the suction block 7, in other words, the suction block 7 itself supplies the cleaning liquid to the head facing flat surface 71. In this way, the mechanism can be more reliably simplified.

Further, the discharge heads H and the dummy block 57*a* are arrayed in the horizontal direction Y, and the head facing flat surface 71 of the suction block 7 located in the head cleaning region Rh and the head facing flat surface of the suction block 7 located in the self-cleaning region Rs are at the same height. This is because the projecting flat surfaces Hb2 of the discharge heads H, with which the head facing flat surface 71 of the suction block 7 comes into contact in the head cleaning region Rh, and the dummy flat surface 571 of the dummy block 57*a*, with which the head facing flat surface 71 of the suction block 7 comes into contact in the self-cleaning region Rs, are flush with each other. In contrast, the suction block 7 moves from the head cleaning region Rh to the self-cleaning region Rs in the horizontal direction Y to perform the self-cleaning in the self-cleaning region Rs after performing the head suction cleaning (head cleaning) in the head cleaning region Rh (Steps S104 to S105). In such a configuration, a smooth transition can be made from the head suction cleaning to the self-cleaning by a simple operation of moving the suction block 7 in the horizontal direction Y without changing the height of the suction block 7.

Further, the dummy block 57*b* (positioning member) is arranged on the side opposite to the dummy block 57*a* with respect to the discharge heads H in the horizontal direction Y. This dummy block 57*b* has the dummy flat surface 571 (contact surface) provided at the height of the head facing flat surface 71 of the suction block 7 located in the head cleaning region Rh. In other words, the projecting flat surfaces Hb2 of the discharge heads H and the dummy flat surface 571 of the dummy block 57*b* are flush with each other. The linear motion mechanism 55 and the elevating mechanism E7 (driver) move the suction block 7 to the head cleaning region Rh by moving the suction block 7 in the horizontal direction Y after the head facing flat surface 71 of the suction block 7 is brought into contact with the dummy flat surface 571 of the dummy block 57*b* from below (Steps S103 to S104). In such a configuration, by bringing the head facing flat surface 71 of the suction block 7 into contact with the dummy flat surface 571 of the dummy block 57*b*, the head facing flat surface 71 can be positioned at the height for performing the head suction cleaning and the self-cleaning. Therefore, the head suction cleaning and the self-cleaning can be smoothly started by moving the suction block 7 in the horizontal direction Y after the head facing flat surface 71 is brought into contact with the dummy flat surface 571.

As described above, in this embodiment, the printing apparatus 3 corresponds to an example of a "printing apparatus" of the invention, the controller 391 corresponds to an example of a "controller" of the invention, the drive controller 391*a* corresponds to an example of a "drive controller" of the invention, the negative pressure controller 391*b* corresponds to an example of a "negative pressure controller" of the invention, the supply controller 391*c* corresponds to an example of a "supply controller" of the invention, the linear motion mechanism 55 and the elevating mechanism E7 correspond to an example of a "driver" of the invention, the dummy block 57*a* corresponds to an example of an "auxiliary cleaning member" of the invention, the dummy flat surface 571 of the dummy block 57*a* corresponds to an example of an "auxiliary cleaning surface" of the invention, the dummy block 57*b* corresponds to an example of a "positioning member" of the invention, the dummy flat surface 571 of the dummy block 57*b* corresponds to an example of a "contact surface" of the invention, the suction block 7 corresponds to an example of an "ink sucking unit" of the invention, the head facing flat surface 71 corresponds to an example of a "head facing surface" of the invention, the suction hole 72 corresponds to an example of a "suction hole" of the invention, the supply hole 73 corresponds to an example of a "supply hole" of the invention, the cleaning liquid supplier 82 corresponds to an example of a "cleaning liquid supplier" of the invention, the negative pressure applier 84 corresponds to an example of a "negative pressure applier" of the invention, the discharge head H corresponds to an example of a "discharge head" of the invention, the ink discharging flat surface Hb1 corresponds to an example of an "ink discharging surface" of the invention, the nozzle Hc corresponds to an example of a "nozzle" of the invention, the head cleaning region Rh corresponds to an example of a "head cleaning region" of the invention, the self-cleaning region Rs corresponds to an example of a "self-cleaning region" of the invention, the horizontal direction Y corresponds to an example of a "horizontal direction" of the invention, the head suction cleaning of Step S104 corresponds to an example of "head cleaning" of the invention, and the self-cleaning of Steps S201 to S204 corresponds to an example of "self-cleaning" of the invention.

Note that the invention is not limited to the embodiment described above and various changes other than the aforementioned ones can be made without departing from the gist of the invention. For example, a specific mode for performing the self-cleaning can be variously changed. That is, a timing of the self-cleaning is not limited to the one after the head suction cleaning, and the self-cleaning may be performed at another timing. Further, the supply and suction of the cleaning liquid may be repeated as described next.

Figure 10:
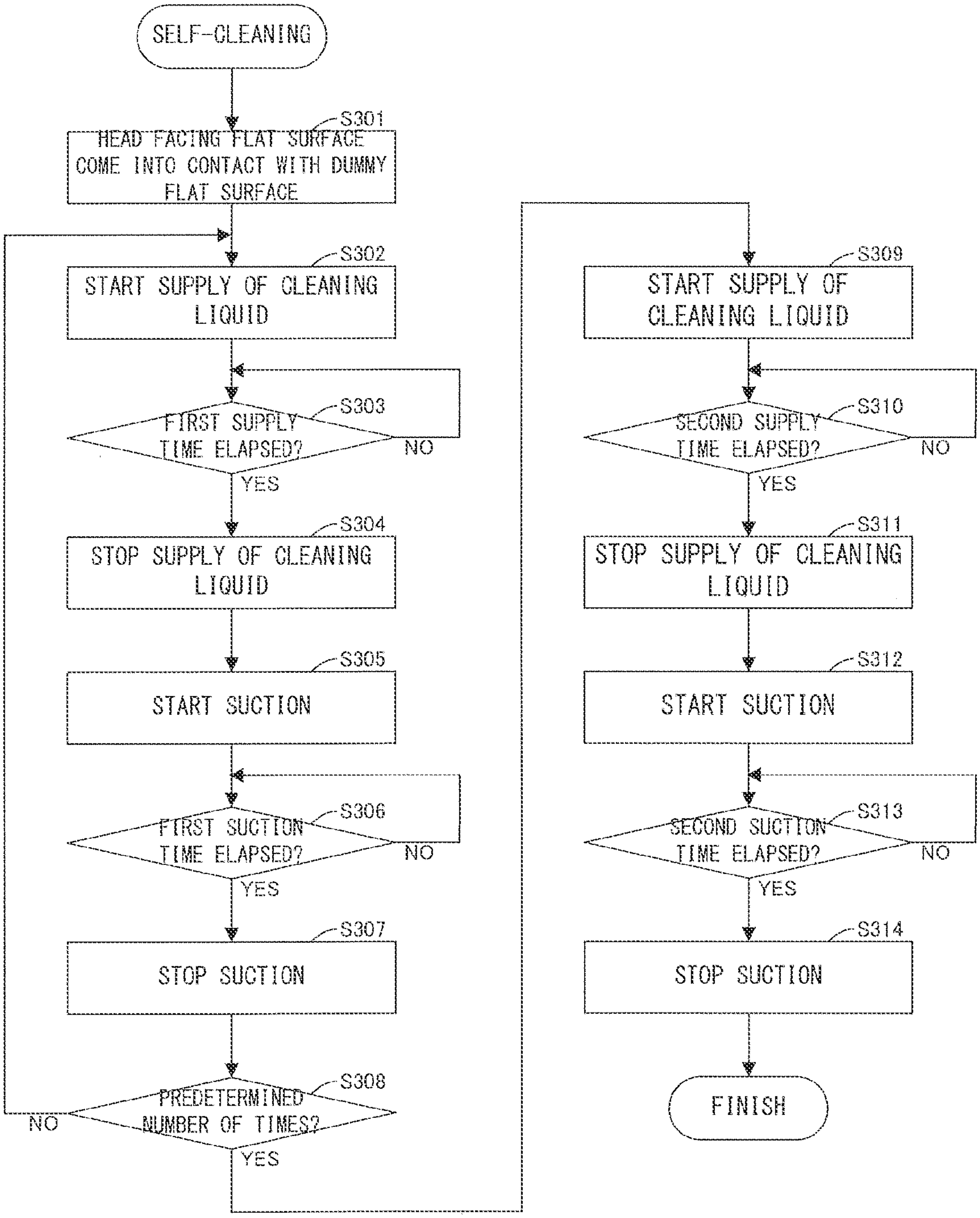
FIG. 10 is a flow chart showing a modification of the self-cleaning.

FIG. 10 is a flow chart showing a modification of the self-cleaning. The flow chart of FIG. 10 is performed by the control of the supply controller 391*c* and the negative pressure controller 391*b* included in the controller 391. In Step S301, the head facing flat surface 71 of the suction block 7 comes into contact with the dummy flat surface 571 of the dummy block 57*a*. In this state, the supply of the cleaning liquid and the supply of the negative pressure are stopped.

Subsequently, the supply of the cleaning liquid to the head facing flat surface 71 via the supply holes 73 is started (Step S302). In Step S303, whether or not a predetermined first supply time has elapsed from the start of the supply of the cleaning liquid is confirmed. By continuing the supply of the cleaning liquid during the first supply time in this way, the cleaning liquid can be spread on the head facing flat surface 71 by the dummy flat surface 571 of the dummy block 57*a* while the cleaning liquid is sufficiently supplied to the head facing flat surface 71. When the first supply time elapses ("YES" in Step S303), the supply of the cleaning liquid is stopped (Step S304).

In Step S305, the supply of the negative pressure to the suction holes 72 is started to start the suction of the cleaning liquid supplied to the head facing flat surface 71. In Step S306, whether or not a predetermined first suction time has elapsed from the start of the suction of the cleaning liquid is confirmed. By continuing the suction of the cleaning liquid during the first suction time in this way, the cleaning liquid can be reliably removed from the head facing flat surface 71. When the first suction time elapses ("YES" in Step S306), the supply of the negative pressure is stopped and the suction of the cleaning liquid is stopped (Step S307).

In Step S308, whether or not the number of times of execution of Steps S302 to S307 has reached a predetermined number is judged. Here, the predetermined number is one or more. Particularly, by setting the predetermined number to two or more, the ink can be reliably removed from the head facing flat surface 71 and the suction holes 72 of the suction block 7 by repeatedly performing Steps S302 to S307. Return is made to Step S302 if the number of times of execution is less than the predetermined number ("NO" in Step S308), and advance is made to Step S309 if the number of times of execution is equal to the predetermined number ("YES" in Step S308).

In Step S309, the supply of the cleaning liquid to the head facing flat surface 71 via the supply holes 73 is started. In Step S310, whether or not a predetermined second supply time has elapsed from the start of the supply of the cleaning liquid is confirmed. By continuing the supply of the cleaning liquid during the second supply time in this way, the cleaning liquid can be spread on the head facing flat surface 71 by the dummy flat surface 571 of the dummy block 57*a* while the cleaning liquid is sufficiently supplied to the head facing flat surface 71. Particularly, the second supply time is longer than the first supply time. When the second supply time elapses ("YES" in Step S310), the supply of the cleaning liquid is stopped (Step S311).

In Step S312, the supply of the negative pressure to the suction holes 72 is started to start the suction of the cleaning liquid supplied to the head facing flat surface 71. In Step S313, whether or not a predetermined second suction time has elapsed from the start of the suction of the cleaning liquid is confirmed. By continuing the suction of the cleaning liquid during the second suction time in this way, the cleaning liquid can be reliably removed from the head facing flat surface 71. Particularly, the second suction time is longer than the first suction time. When the second suction time elapses ("YES" in Step S313), the supply of the negative pressure is stopped and the suction of the cleaning liquid is stopped (Step S314).

In this modification, the controller 391 performs Steps S302 to S307 (first self-cleaning) in which the cleaning liquid is supplied through the supply holes 73 for the first supply time and sucked through the suction holes 72 for the first suction time by the cleaning unit 8 (cleaning liquid supplier) and Steps S309 to S314 (second self-cleaning) in which the cleaning liquid is supplied through the supply holes 73 for the second supply time and sucked through the suction holes 72 for the second suction time by the cleaning unit 8. Specifically, Steps S309 to S314 are performed after Steps S302 to S307 are performed a predetermined number of times. Particularly, the second supply time is longer than the first supply time and the second suction time is longer than the first suction time. In such a configuration, the self-cleaning is performed at least twice (Steps S302 to S207 and Steps S309 to S314). At this time, the supply time of the cleaning liquid in the later self-cleaning (S309 to S314) (second supply time) is longer than the supply time of the cleaning liquid in the previous self-cleaning (Steps S302 to S307) (first supply time), and the suction time of the cleaning liquid in the later self-cleaning (S309 to S314) (second suction time) is longer than the suction time of the cleaning liquid in the previous self-cleaning (Steps S302 to S307) (first suction time). By finishing the cleaning of the suction block 7 (ink sucking unit) by the self-cleaning (S309 to S314) having relatively longer supply time and suction time of the cleaning liquid, the ink can be more reliably removed from the suction block 7.

Note that the flow chart of FIG. 10 may be changed. For example, the second supply time may be set equal to or shorter than the first supply time. The second suction time may be set equal to or shorter than the first suction time.

Further, the supply timing of the cleaning liquid to the head facing flat surface 71 of the suction block 7 may be changed as appropriate. That is, in the above example, the cleaning liquid is supplied to the head facing flat surface 71 of the suction block 7 with the head facing flat surface 71 held in contact with the dummy flat surface 571 of the dummy block 57*a*. However, the head facing flat surface 71 of the suction block 7 may be brought into contact with the dummy flat surface 571 after the cleaning liquid is supplied to the head facing flat surface 71 with the head facing flat surface 71 separated from the dummy flat surface 571 of the dummy block 57*a*. The cleaning liquid can be spread on the head facing flat surface 71 by the dummy flat surface 571 also by such an operation.

Further, in supplying and sucking the cleaning liquid in the self-cleaning of the suction block 7, the head facing flat surface 71 of the suction block 7 needs not necessarily be in contact with the dummy flat surface 571 of the dummy block 57*a*. That is, the cleaning liquid may be supplied and sucked with the head facing flat surface 71 of the suction block 7 facing the dummy flat surface 571 of the dummy block 57*a* across a tiny clearance.

Further, the specific configuration for supplying the cleaning liquid may be changed as appropriate. For example, the supply holes for the cleaning liquid may be provided not in the suction block 7, but in the dummy block 57*a*. In such a configuration, the cleaning unit 8 supplies the cleaning liquid to the head facing flat surface 71 of the suction block 7 through the supply holes open in the dummy flat surface 571 of the dummy block 57*a*.

Further, it is not essential to provide two dummy blocks 57*a*, 57*b* and only one dummy block 57*a* may be provided.

Further, the arranged position of the dummy block 57*a* is not limited to the one in the above example and may be changed as appropriate. The dummy block 57*a* needs not necessarily be mounted on the head unit 321.

Further, the head suction cleaning by the suction block 7 may be performed by moving the discharge heads H in the horizontal direction Y. In short, the suction block 7 may be relatively moved with respect to the discharge heads H.

The invention is applicable to techniques in general for cleaning an ink sucking unit sucking an ink adhering to a discharge head discharging the ink.

The printing apparatus may be configured so that a supply hole is open in the head facing surface, and the cleaning liquid supplier supplies the cleaning liquid to the head facing surface through the supply hole. In such a configuration, the cleaning liquid is supplied through the supply hole open in the head facing surface of the ink sucking unit, in other words, the ink sucking unit itself supplies the cleaning liquid to the head facing surface. In this way, the mechanism can be more reliably simplified.

The printing apparatus may be configured so that the discharge head and the auxiliary cleaning member are arrayed in a predetermined horizontal direction, the head facing surface of the ink sucking unit located in the head cleaning region and the head facing surface of the ink sucking unit located in the self-cleaning region are at the same height, and the drive controller controls the driver to move the ink sucking unit from the head cleaning region to the self-cleaning region and cause the ink sucking unit to perform the self-cleaning after controlling the driver to move the ink sucking unit to the head cleaning region and cause the ink sucking unit to perform the head cleaning. In such a configuration, a smooth transition can be made from the head cleaning to the self-cleaning by a simple operation of moving the ink sucking unit in the horizontal direction.

The printing apparatus may further comprises a positioning member arranged on a side opposite to the auxiliary cleaning member with respect to the discharge head in the horizontal direction, wherein: the positioning member has a contact surface provided at the height of the head facing surface of the ink sucking unit located in the head cleaning region, and the drive controller controls the driver to move the ink sucking unit to the head cleaning region by moving the ink sucking unit in the horizontal direction after moving the ink sucking unit to a position where the head facing surface comes into contact with the contact surface of the positioning member. In such a configuration, the head facing surface can be positioned at the height where the head cleaning and the self-cleaning are performed by bringing the head facing surface of the ink sucking unit into contact with the contact surface of the positioning member. Therefore, the head cleaning and the self-cleaning can be smoothly started by moving the ink sucking unit in the horizontal direction after bringing the head facing surface into contact with the contact surface.

The printing apparatus may be configured so that after first self-cleaning is performed once or more by the supply controller controlling the cleaning liquid supplier to supply the cleaning liquid from the cleaning liquid supplier for a first supply time and the negative pressure controller controlling the negative pressure applier to suck the cleaning liquid through the suction hole for a first suction time, second self-cleaning is performed by the supply controller controlling the cleaning liquid supplier to supply the cleaning liquid from the cleaning liquid supplier for a second supply time longer than the first supply time and the negative pressure controller controlling the negative pressure applier to suck the cleaning liquid through the suction hole for a second suction time longer than the first suction time. In such a configuration, the self-cleaning is performed at least twice (first self-cleaning and second self-cleaning). At this time, the supply time of the cleaning liquid in the later second self-cleaning (second supply time) is longer than the supply time of the cleaning liquid in the previous first self-cleaning (first supply time), and the suction time of the cleaning liquid in the later second self-cleaning (second suction time) is longer than the suction time of the cleaning liquid in the previous first self-cleaning (first suction time). By finishing the cleaning of the ink sucking unit by the second self-cleaning having relatively longer supply time and suction time of the cleaning liquid, the ink can be more reliably removed from the ink sucking unit.

As described above, according to the invention, the removal of an ink from an ink sucking unit sucking the ink from a discharge head can be reliably performed by a simple mechanism.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printing apparatus, comprising:

a discharge head having an ink discharging surface, in which a nozzle opens, and discharging an ink from the nozzle;

an ink sucking unit having a head facing surface, in which a suction hole opens, and sucking the ink through the suction hole;

a negative pressure applier applying a negative pressure to the suction hole of the ink sucking unit;

a cleaning liquid supplier supplying a cleaning liquid to the head facing surface;

an auxiliary cleaning member having an auxiliary cleaning surface;

a driver moving the ink sucking unit between a head cleaning region at which the head facing surface is facing the ink discharging surface and a self-cleaning region at which the head facing surface is facing the auxiliary cleaning surface; and a controller controlling the negative pressure applier, the cleaning liquid supplier and the driver, wherein:

the controller includes:

a negative pressure controller controlling the negative pressure applier;

a drive controller controlling the driver; and a supply controller controlling the cleaning liquid supplier, when performing a head cleaning, the drive controller controls the driver to move the ink sucking unit to the head cleaning region and further move the ink sucking unit in a horizontal direction in the head cleaning region while the head facing surface of the ink sucking unit is facing the ink discharging surface of the discharge head in the head cleaning region, and the negative pressure controller controls to activate the negative pressure applier and generate a negative pressure in the suction hole of the ink sucking unit, thereby sucking the ink adhering to the ink discharging surface through the suction hole while the ink sucking unit is moving in a horizontal direction in the head cleaning region, when performing a self-cleaning, the drive controller controls the driver to move the ink sucking unit to the self-cleaning region and cause the head facing surface of the ink sucking unit to face the auxiliary cleaning surface in the self-cleaning region, the supply controller controls the cleaning liquid supplier to supply the cleaning liquid to the head facing surface of the ink sucking unit from the cleaning liquid supplier in the self-cleaning region, and the negative pressure controller controls to activate the negative pressure applier and generate a negative pressure in the suction hole of the ink sucking unit, thereby sucking the cleaning liquid through the suction hole while bringing the cleaning liquid supplied to the head facing surface into contact with the auxiliary cleaning surface.

2. The printing apparatus according to claim 1, wherein:

a supply hole is open in the head facing surface, and the cleaning liquid supplier supplies the cleaning liquid to the head facing surface through the supply hole.

3. The printing apparatus according to claim 1, wherein:

the discharge head and the auxiliary cleaning member are arrayed in a predetermined horizontal direction, the head facing surface of the ink sucking unit located in the head cleaning region and the head facing surface of the ink sucking unit located in the self-cleaning region are at the same height, and the drive controller controls the driver to move the ink sucking unit from the head cleaning region to the self-cleaning region and cause the ink sucking unit to perform the self-cleaning after controlling the driver to move the ink sucking unit to the head cleaning region and cause the ink sucking unit to perform the head cleaning.

4. The printing apparatus according to claim 3, further comprising a positioning member arranged on a side opposite to the auxiliary cleaning member with respect to the discharge head in the horizontal direction, wherein:

the positioning member has a contact surface provided at the height of the head facing surface of the ink sucking unit located in the head cleaning region, and the drive controller controls the driver to move the ink sucking unit to the head cleaning region by moving the ink sucking unit in the horizontal direction after moving the ink sucking unit to a position where the head facing surface comes into contact with the contact surface of the positioning member.

5. The printing apparatus according to claim 1, wherein:

after first self-cleaning is performed once or more by the supply controller controlling the cleaning liquid supplier to supply the cleaning liquid from the cleaning liquid supplier for a first supply time and the negative pressure controller controlling the negative pressure applier to suck the cleaning liquid through the suction hole for a first suction time, and second self-cleaning is performed by the supply controller controlling the cleaning liquid supplier to supply the cleaning liquid from the cleaning liquid supplier for a second supply time longer than the first supply time and the negative pressure controller controlling the negative pressure applier to suck the cleaning liquid through the suction hole for a second suction time longer than the first suction time.

6. An ink sucking unit cleaning method, comprising:

moving an ink sucking unit to a head cleaning region at which an ink discharging surface of a discharge head is facing a head facing surface of an ink sucking unit, the discharge head configured to discharge an ink from a nozzle opening in the ink discharging surface, the ink sucking unit configured to suck from a suction hole opening in the head facing surface, further moving the ink sucking unit in a horizontal direction in the head cleaning region while the head facing surface of the ink sucking unit is facing the ink discharging surface of the discharge head in the head cleaning region;

generating a negative pressure in the suction hole of the ink sucking unit thereby sucking the ink adhering to the ink discharging surface through the suction hole while the ink sucking unit is moving in a horizontal direction in the head cleaning region;

moving the ink sucking unit to a self-cleaning region at which the head facing surface is facing an auxiliary cleaning surface of an auxiliary cleaning member;

supplying a cleaning liquid to a head facing surface;

bringing the auxiliary cleaning surface of the auxiliary cleaning member facing the head facing surface and the cleaning liquid supplied to the head facing surface into contact; and sucking the cleaning liquid on the head facing surface through the suction hole.

7. A printing apparatus comprising:

a discharge head having an ink discharging surface, in which a nozzle opens, and discharging an ink from the nozzle;

an ink sucking unit having a head facing surface, in which a suction hole opens, and sucking the ink through the suction hole;

a negative pressure applier applying a negative pressure to the suction hole of the ink sucking unit;

a cleaning liquid supplier supplying a cleaning liquid to the head facing surface;

an auxiliary cleaning member having an auxiliary cleaning surface;

a driver moving the ink sucking unit between a head cleaning region at which the head facing surface is facing the ink discharging surface and a self-cleaning region at which the head facing surface is facing the auxiliary cleaning surface; and a controller controlling the negative pressure applier, the cleaning liquid supplier and the driver, wherein the controller includes:

a negative pressure controller controlling the negative pressure applier;

a drive controller controlling the driver; and a supply controller controlling the cleaning liquid supplier, wherein, when performing a head cleaning, the drive controller controls the driver to move the ink sucking unit to the head cleaning region and further move the ink sucking unit while the head facing surface of the ink sucking unit is facing the ink discharging surface of the discharge head in the head cleaning region, and the negative pressure controller controls to activate the negative pressure applier and generate a negative pressure in the suction hole of the ink sucking unit, thereby sucking the ink adhering to the ink discharging surface through the suction hole, wherein, when performing a self-cleaning, the drive controller controls the driver to move the ink sucking unit to the self-cleaning region and cause the head facing surface of the ink sucking unit to face the auxiliary cleaning surface in the self-cleaning region, the supply controller controls the cleaning liquid supplier to supply the cleaning liquid to the head facing surface of the ink sucking unit from the cleaning liquid supplier in the self-cleaning region, and the negative pressure controller controls to activate the negative pressure applier and generate a negative pressure in the suction hole of the ink sucking unit, thereby sucking the cleaning liquid through the suction hole while bringing the cleaning liquid supplied to the head facing surface into contact with the auxiliary cleaning surface, wherein the discharge head and the auxiliary cleaning member are arrayed in a predetermined horizontal direction, wherein the head facing surface of the ink sucking unit located in the head cleaning region and the head facing surface of the ink sucking unit located in the self-cleaning region are at the same height, and wherein the drive controller controls the driver to move the ink sucking unit from the head cleaning region to the self-cleaning region and cause the ink sucking unit to perform the self-cleaning after controlling the driver to move the ink sucking unit to the head cleaning region and cause the ink sucking unit to perform the head cleaning.

8. A printing apparatus comprising:

a discharge head having an ink discharging surface, in which a nozzle opens, and discharging an ink from the nozzle;

an ink sucking unit having a head facing surface, in which a suction hole opens, and sucking the ink through the suction hole;

a negative pressure applier applying a negative pressure to the suction hole of the ink sucking unit;

a cleaning liquid supplier supplying a cleaning liquid to the head facing surface;

an auxiliary cleaning member having an auxiliary cleaning surface;

a driver moving the ink sucking unit between a head cleaning region at which the head facing surface is facing the ink discharging surface and a self-cleaning region at which the head facing surface is facing the auxiliary cleaning surface; and a controller controlling the negative pressure applier, the cleaning liquid supplier and the driver, wherein the controller includes:

a negative pressure controller controlling the negative pressure applier;

a drive controller controlling the driver; and a supply controller controlling the cleaning liquid supplier, wherein, when performing a head cleaning, the drive controller controls the driver to move the ink sucking unit to the head cleaning region and further move the ink sucking unit while the head facing surface of the ink sucking unit is facing the ink discharging surface of the discharge head in the head cleaning region, and the negative pressure controller controls to activate the negative pressure applier and generate a negative pressure in the suction hole of the ink sucking unit, thereby sucking the ink adhering to the ink discharging surface through the suction hole, wherein, when performing a self-cleaning, the drive controller controls the driver to move the ink sucking unit to the self-cleaning region and cause the head facing surface of the ink sucking unit to face the auxiliary cleaning surface in the self-cleaning region, the supply controller controls the cleaning liquid supplier to supply the cleaning liquid to the head facing surface of the ink sucking unit from the cleaning liquid supplier in the self-cleaning region, and the negative pressure controller controls to activate the negative pressure applier and generate a negative pressure in the suction hole of the ink sucking unit, thereby sucking the cleaning liquid through the suction hole while bringing the cleaning liquid supplied to the head facing surface into contact with the auxiliary cleaning surface, and wherein, after first self-cleaning is performed once or more by the supply controller controlling the cleaning liquid supplier to supply the cleaning liquid from the cleaning liquid supplier for a first supply time and the negative pressure controller controlling the negative pressure applier to suck the cleaning liquid through the suction hole for a first suction time, second self-cleaning is performed by the supply controller controlling the cleaning liquid supplier to supply the cleaning liquid from the cleaning liquid supplier for a second supply time longer than the first supply time and the negative pressure controller controlling the negative pressure applier to suck the cleaning liquid through the suction hole for a second suction time longer than the first suction time.

* * * * *